United States Patent [19]

Wingerath

[11] Patent Number: 5,003,588
[45] Date of Patent: Mar. 26, 1991

[54] CIRCUIT ARRANGEMENT FOR PROTECTING ELECTRONIC INTERFACE CIRCUIT OF SUBSCRIBER LINE CIRCUITS

[75] Inventor: Norbert Wingerath, Munich, Fed. Rep. of Germany

[73] Assignee: Siemens Aktiengesellshaft, Berlin and Munich, Fed. Rep. of Germany

[21] Appl. No.: 352,694

[22] Filed: May 4, 1989

Related U.S. Application Data

[63] Continuation of Ser. No. 53,995, May 26, 1987, abandoned.

[30] Foreign Application Priority Data

Jun. 6, 1986 [DE] Fed. Rep. of Germany ....... 3619037

[51] Int. Cl.$^5$ .............................................. H04M 7/0
[52] U.S. Cl. ................................... 379/412; 379/331; 361/119
[58] Field of Search ............... 379/412, 405, 413, 399, 379/331; 361/56, 91, 117, 118, 119; 307/305, 639, 645

[56] References Cited

U.S. PATENT DOCUMENTS

| | | | |
|---|---|---|---|
| 3,263,128 | 7/1966 | White ................................ | 307/639 |
| 3,590,346 | 6/1971 | Bilo ................................... | 307/305 X |
| 3,614,474 | 10/1971 | Hahn ................................. | 307/305 X |
| 3,825,699 | 7/1974 | Danner ............................. | 379/399 |
| 4,188,548 | 2/1980 | Ohninata ........................ | 307/305 X |
| 4,213,066 | 7/1980 | Rogers ............................. | 307/305 X |
| 4,217,504 | 8/1980 | Füllmann et al. ............... | 307/305 X |
| 4,377,832 | 3/1983 | Toney et al. ..................... | 361/56 |
| 4,453,092 | 6/1984 | Joseph ............................. | 361/56 X |
| 4,456,940 | 6/1984 | Hammerberg et al. .......... | 361/56 |
| 4,644,437 | 2/1987 | Robe .................................. | 361/56 |
| 4,661,878 | 4/1987 | Brown et al. ..................... | 361/56 |
| 4,661,979 | 4/1987 | Jakab ................................ | 379/412 |
| 4,695,916 | 9/1987 | Satoh ................................ | 361/56 |

FOREIGN PATENT DOCUMENTS 2119187 11/1983 United Kingdom .................. 361/56

OTHER PUBLICATIONS

Modern Electronic Devices: Circuit Design and Application, M. Rosenstein et al., Reston Publishing Comp. Inc., Reston, Va., 1985, pp. 99, 100, 306, 307.

"Low-Level Over-Voltage Protect Circuit", A. N. Luce et al., IBM Tech. Disclosure Bulletin, vol. 13, No. 2, Jul. 1970, p. 509.

Primary Examiner—James L. Dwyer
Attorney, Agent, or Firm—Adel A. Ahmed

[57] ABSTRACT

Thyristors utilized as protective elements receive trigger current by way of a respective semiconductor switch having a control electrode thereof coupled to a supply battery. The supply battery thus need only supply the sum of control currents for respective semiconductor switches whereas the current required by the protective thyristors is provided by the interfering source, for example, by a stroke of lightning.

3 Claims, 2 Drawing Sheets

2

CIRCUIT ARRANGEMENT FOR PROTECTING ELECTRONIC INTERFACE CIRCUIT OF SUBSCRIBER LINE CIRCUITS

CROSS-REFERENCE TO RELATED APPLICATION

This is a continuation of Ser. No. 07/053,995 filed May 26, 1987 now abandoned.

BACKGROUND OF THE INVENTION

The present invention relates to a circuit arrangement for protecting the electronic interface circuit of subscriber line circuits in a digital time multiplex telecommunications nework which are coupled in groups to a supply battery for providing subscriber current supply, using thyristors as protective elements which provide a low impedance shunt path for excessive voltages on the conductors of the subscriber line coupled to the subscriber line circuit.

The requirement that voltages greater than the supply voltage do not reach components of the interface circuit can be provided for if the supply battery voltage is applied to the control electrode of the thyristors used a protective elements.

Over-voltages due to the effect of lightning on the subscriber lines are primarily the over-voltages to be considered against which such a protective circuit should be effective. A plurality of conductor pairs is always affected in a lightning strike, so that the thyristor protective elements must be simultaneously triggered to be in conductive condition in a plurality of conductor pairs, with the result that the battery, which may comprise an electronic switching regulator, is not able to supply the sum of the trigger, or firing, currents where the trigger current is in the order of 50-250 mA per thyristor, which signifies that proper response of the protective elements for all affected subscriber lines is no longer assured.

SUMMARY OF THE INVENTION

A task of the invention is to provide a circuit arrangement which assures certain protection of the subscriber lines also under the circumstances described.

In accordance with an aspect of the invention, a circuit arrangement for protects an electronic interface circuit for subscriber line circuits of a digital time multiplex telecommunications network. The subscriber line circuits are coupled group-wise to a supply battery for providing subscriber current supply, using thyristors as protective elments for providing a low impedance shunt path for over-voltages on conductors of a subscriber line compled to a subscriber line circuit. The over-voltages exceed a supply voltage provided by the supply battery. The circuit arrangement comprises a plurality of thyristors, each having a main conduction path coupled between a respective one of said conductors of said subscriber line and a circuit point referenced to earth potential. Respective semiconductor switches are coupled between one main electrode and a control electrode of respective ones of the plurality of thyristors and have the supply voltage provided by the supply battery to respective control electrodes thereof. The respective semiconductor switches require less control current than the thyristors.

The task is solved by a circuit arrangement of the aforementioned type which, in accordance with the invention, is characterized in that a semiconductor switch having a control electrode to which the supply battery voltage is applied and having a lower current requirement than the thyristors, is coupled between a main electrode and the control electrode of respective thyristors having a main conduction path coupled between a subscriber line conductor and grounded circuit point.

In the protective circuit in accordance with the invention, the supply battery need only provide the substantially lower trigger currents for the semiconductor switches, whereas the trigger current for the actual protective elements, that is, the thyristors, is branched off from the lightning current flowing towards earth potential and thereby does not load the supply battery.

In accordance with a first embodiment of the invention, a small thyristor is used as semiconductor switch. In another embodiment of the invention, the semiconductor switch is a transistor.

BRIEF DESCRIPTION OF THE DRAWINGS

The invention will next be explained in more detial by way of an exemplary embodiment with the aid of.

DESCRIPTION OF THE PREFERRED EMBODIMENTS

Figure 1:
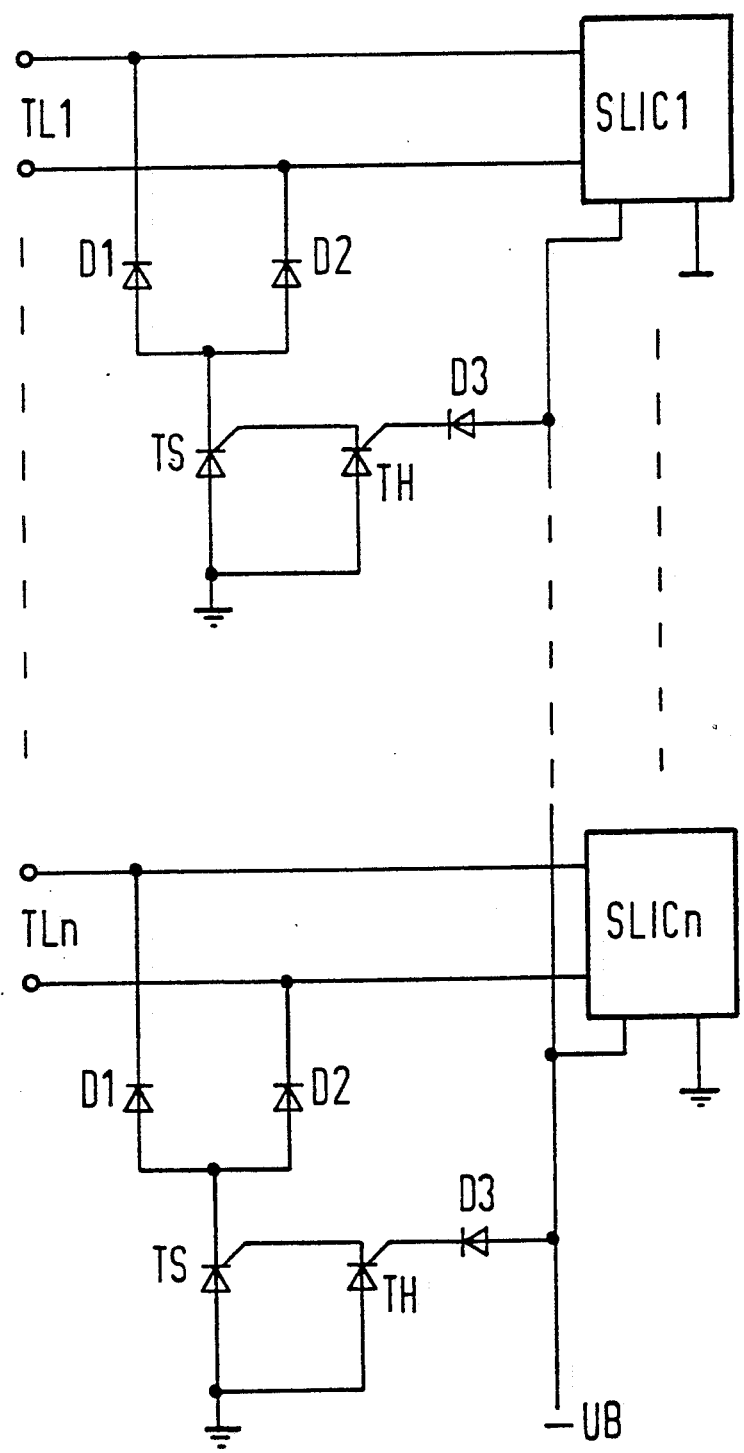
FIG. 1 is a first embodiment showing a protective thyristor gated by an auxillary thyristor.

FIG. 1 shows only that portion of a circuit arrangement in accordance with the invention which provides protection against negative lightning voltages relative to the supply potential −UB. A corresponding arrangement is contemplated for shunting positive lightning voltages when the supply potential +UB is exceeded.

FIG. 1 shows a protective thyristor TS having one of its main electrodes at earth potential and its other main electrode coupled by way of diodes D1 and D2 to conductors a and b of a subscriber line TL. Diodes D1 and D2 serve to decouple both line conductors. The subscriber line circuit for the subscriber line TL whose interface circuit is to be protected is designated SLIC.

An auxiliary thyristor TH is coupled by its main electrodes to the gate electrode and the earthed main electrode of protective thyristor TS. The supply voltage potential −UB is applied to the gate electrode of auxiliary thyristor TH by way of a further diode D3. This diode prevents a short-circuit of the supply battery when the protective circuit is conductive. Auxiliary thyristor TH is a small thyristor requiring substantially less current than protective thyristor TS.

When negative over-voltages, for example, negative lightning voltages occur on conductors a and b subscriber line TL, which exceed supply voltage potential −UB, the response threshold of the protective thyristor, which is defined by auxiliarty thyristor TH to which the supply voltage potential −UB is applied, will be exceeded, causing protective thyristor TS to become conductive so that shunting of the lightning voltages to earth potential occurs. The control current for protective thyristor TS is thereby supplied by way of the main conduction path of auxiliary thyrisotor TH and directly shunted from the lightning current, so that it does not load down the supply battery. Even in the case where protective circuits of the type described for a larger group of subscriber lines or subscriber circuits have to be provided control current from the same supply battery in the event of a plurality of subscriber lines being affected by stroke of lightning, the total control current required will not exceed the supply battery capacity due to the relatively small current requirement of auxiliary thyristor TH, so that proper functioning of all protective circuits is assured.

The other portion referred to of the protective circuit in accordance with the invention will respond in the event of possitive over-voltages which exceed the supply voltage potential +UB.

Figure 2:
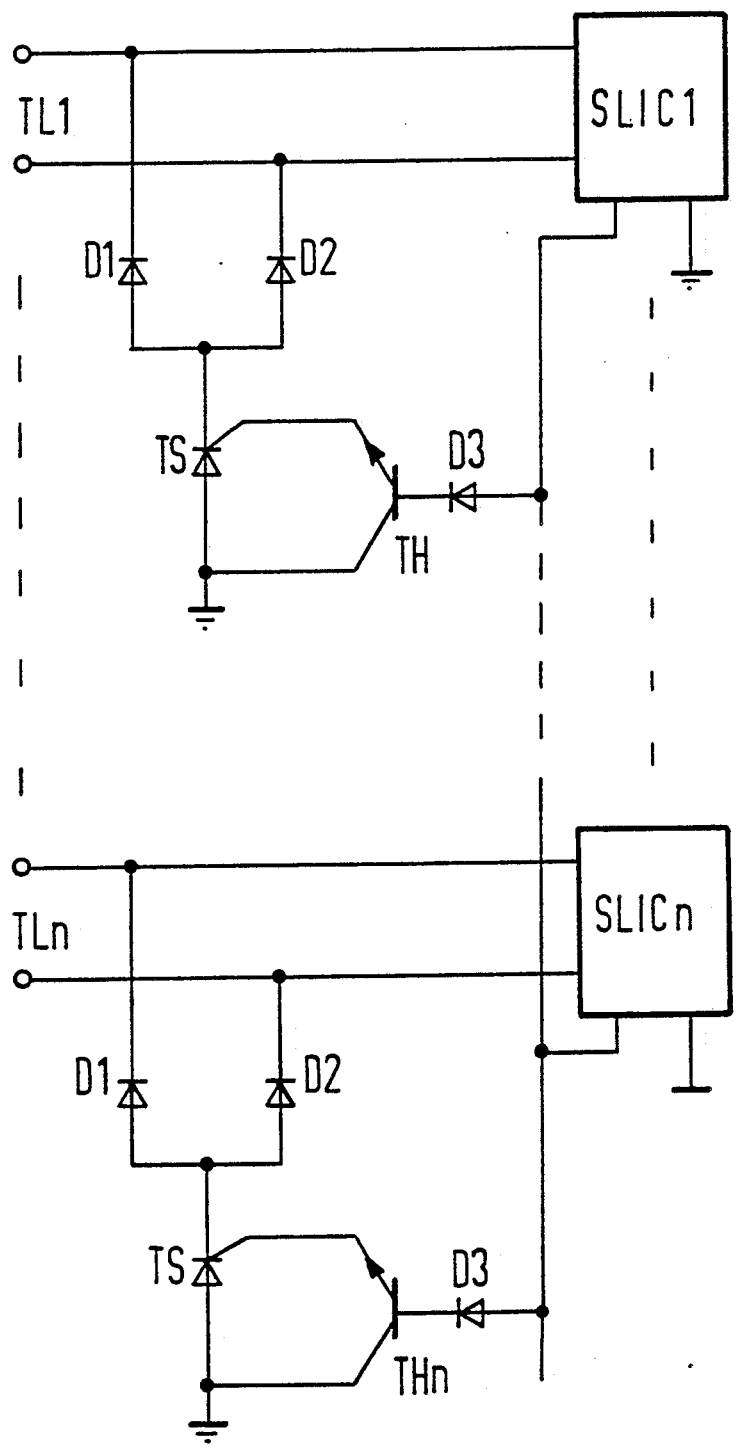
FIG. 2 is a second embodiment showing a protective thyristor gated by a transistor.

In accordance with another embodiment of the invention shown in FIG. 2, an auxiliary transistor with a correspondingly small control current requirement can also be used in place of auxiliary thyristor TH.

What is claimed is:

1. Circuit arrangement for protecting an electronic interface circuit for subscriber line circuits of a digital time multiplex telecommunications network, said subscriber line circuits being coupled group-wise to a supply battery for providing subscriber current supply, and using thyristors as protective elements for providing a low impedance shunt path for over-voltages on conductors of a subscriber line coupled to a subscriber line circuit, said over-voltage exceeding a supply voltage provided by said supply battery, comprising:

a plurality of protective thyristors each having a main conduction path coupled between conductors of a respective subscriber line and a circuit point referenced to earth potential, and each having a respective control electrode responsive for turn-on to a first control electrode current magnitude; and a plurlaity of respective semiconductor switch means, each having main electrodes and a respective control electrode responsive for turn-on to a second control electrode current magnitude which is substantially less than said first control electrode current magnitude, said plurality of semiconductor switch means having their main electrodes coupled between one main electrode and a control electrode of respective ones of said plurality of protective thyristors, and having their control electrodes connected in common to said supply battery, whereby in the event of lightning or another over-voltage event, said supply battery need only provide the substantially lower trigger currents for the plurality of semiconductor switch means, and the control electrode currents of said protective thyristors are drawn from the shunted lightning or over-voltage currents via the main conduction paths of said semiconductor switching means, in order to render said protective thyristors conductive so that shunting of the lightning or other over-voltage currents to earth potential can occur and so that said supply battery does not otherwise become loaded down by the larger control electrode currents of the protective thyristors.

2. Circuit arrangement according to claim 1, wherein each of said semiconductor switch means comprises a thyristor of lower power rating than a protective thyristor of said plurality of protective thyristors.

3. Circuit arrangement according to claim 1, wherein each of said respective semiconductor switch means comprises a switching transistor of lower power rating than a protective thyristor of said plurlaity of protective thyristors.

* * * * *